United States Patent [19]

Nakajima

[11] Patent Number: 5,223,885
[45] Date of Patent: Jun. 29, 1993

[54] RANGE METER FOR CAMERA

[75] Inventor: Yuji Nakajima, Chiba, Japan

[73] Assignee: Seikosha Co., Ltd., Tokyo, Japan

[21] Appl. No.: 908,502

[22] Filed: Jun. 30, 1992

Related U.S. Application Data

[63] Continuation of Ser. No. 634,281, Dec. 26, 1990, abandoned.

[30] Foreign Application Priority Data

Dec. 28, 1989 [JP] Japan ................................ 1-343841

[51] Int. Cl.⁵ .............................................. G03B 13/36
[52] U.S. Cl. ........................................ 354/403; 356/1
[58] Field of Search ..................... 354/403, 409; 356/1

[56] References Cited

U.S. PATENT DOCUMENTS

| | | | |
|---|---|---|---|
| 4,534,636 | 8/1985 | Sugawara . | |
| 4,740,806 | 4/1988 | Takehana . | |
| 4,827,303 | 5/1989 | Tsuboi | 354/403 |
| 4,983,033 | 1/1991 | Suzuki | 354/403 |
| 5,006,700 | 4/1991 | Kusaka et al. | 354/403 |

Primary Examiner—Russell E. Adams
Attorney, Agent, or Firm—Jordan and Hamburg

[57] ABSTRACT

A range meter for a camera has a plurality of irradiation sources for irradiating beams in different directions, and a plurality of receivers for receiving reflected irradiation, the receivers providing outputs responsive to the point of the respective receiver that receives irradiation. In order to adapt the meter for measurement in different distance ranges, the outputs of the receivers are sensed in response to irradiation from different sets of the sources.

5 Claims, 4 Drawing Sheets

F I G. 2
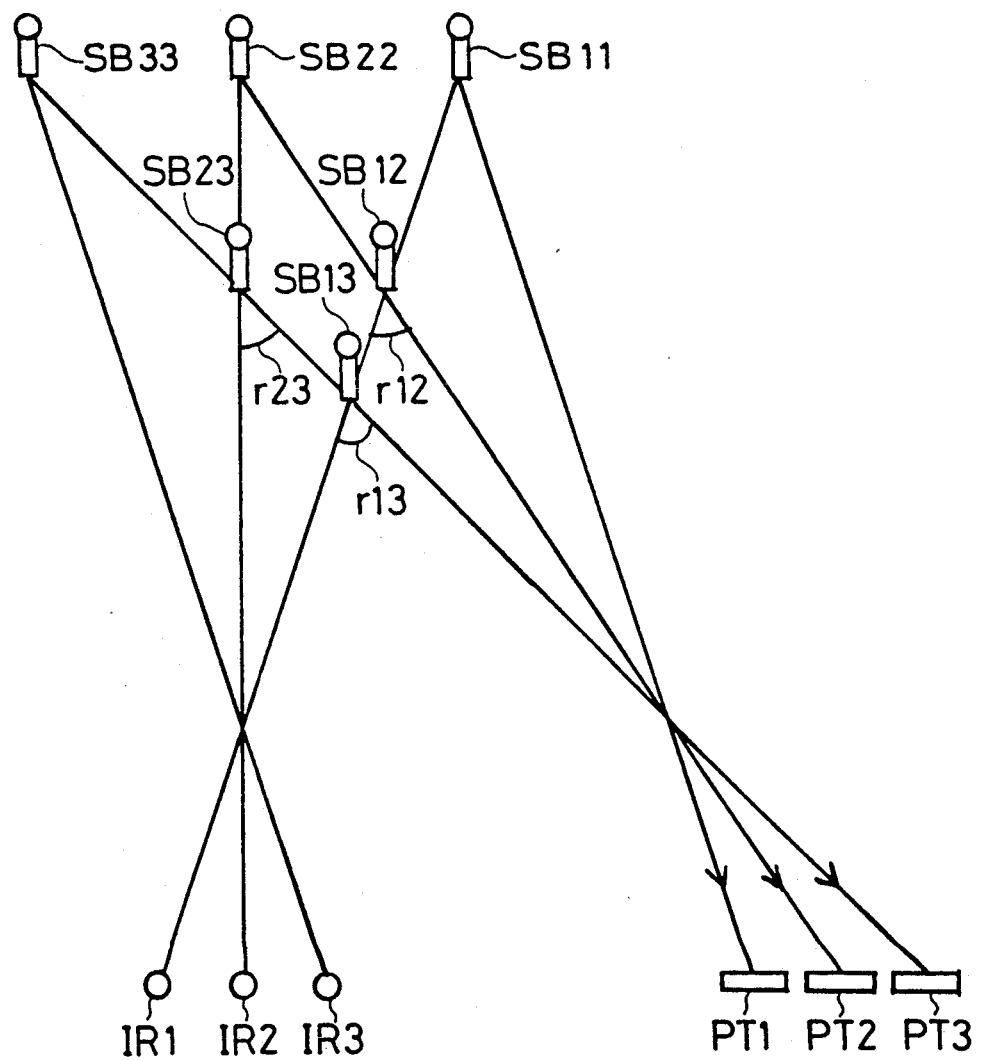

RANGE METER FOR CAMERA

This application is a continuation of application Ser. No. 07/634,281, filed Dec. 26, 1990, now abandoned.

FIELD OF THE INVENTION

This invention relates to a range meter for cameras.

BACKGROUND OF THE INVENTION

In automatic focusing (AF type) cameras, generally, the distance to a subject to be photographed is measured by triangulation.

In this method, a far infrared beam is projected from a light projecting element toward the subject, the reflected light from the subject is received by a light receiving element, and the distance to the subject is calculated on the basis of the point of the light receiving element at which light is received.

In such a method, wherein only a pair of light projecting and light receiving elements is used, however, it is difficult to obtain the correct distance unless the subject to be photographed is positioned at the center of a finder. In view of such circumstances, a so-called multi automatic focusing (multi AF type) range meter is also known (see, for example, Japanese Patent Laid-Open No. 87-223734) which uses a plurality of pairs of light projecting and light receiving elements. In this multi AF type range meter, the light projecting elements and the light receiving elements are disposed correspondingly one to one, and each pair of elements is employed for measurement of the distance of only one of the subjects distributed in different directions.

When the triangulation method is used to measure distances in a near region or macro region, since the angle of reflection taken by the reflected light on the subject is large, the reflected light extends beyond the light receiving element. Therefore, it is difficult for conventional multi AF type cameras to photograph in the macro region.

SUMMARY OF THE INVENTION

It is an object of the present invention to provide a range meter for multi AF type cameras which can readily measure distances even when the subject to be photographed is present in a region close to the camera.

BRIEF DESCRIPTION OF THE DRAWINGS

Embodiments of the present invention will now be described with reference to the accompanying drawings, wherein:

FIG. 2 is a diagram showing the principle of operation of the invention;

DESCRIPTION OF THE PREFERRED EMBODIMENTS

Figure 1:
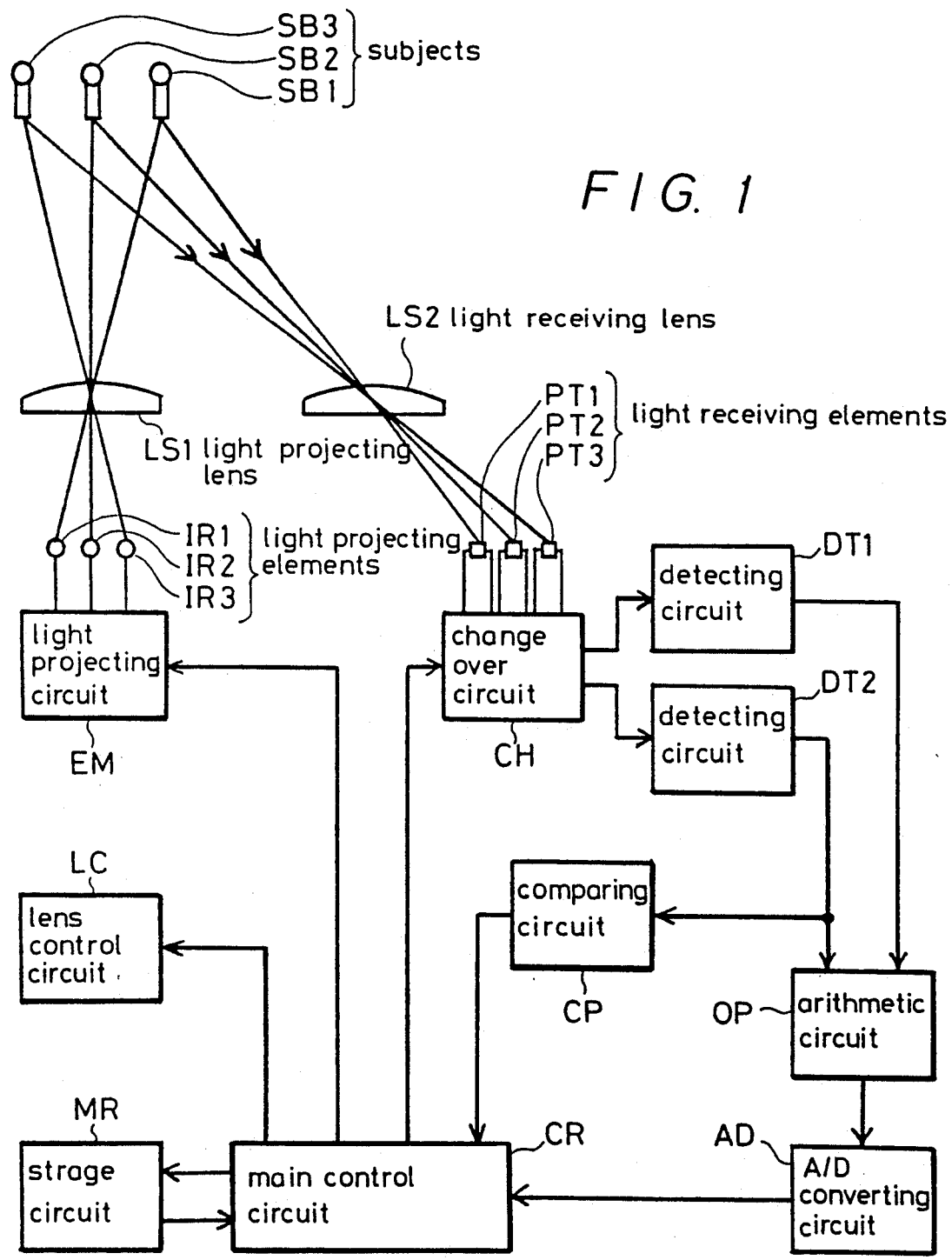
FIG. 1 is a block diagram showing a first embodiment of the invention.
Figure 3:
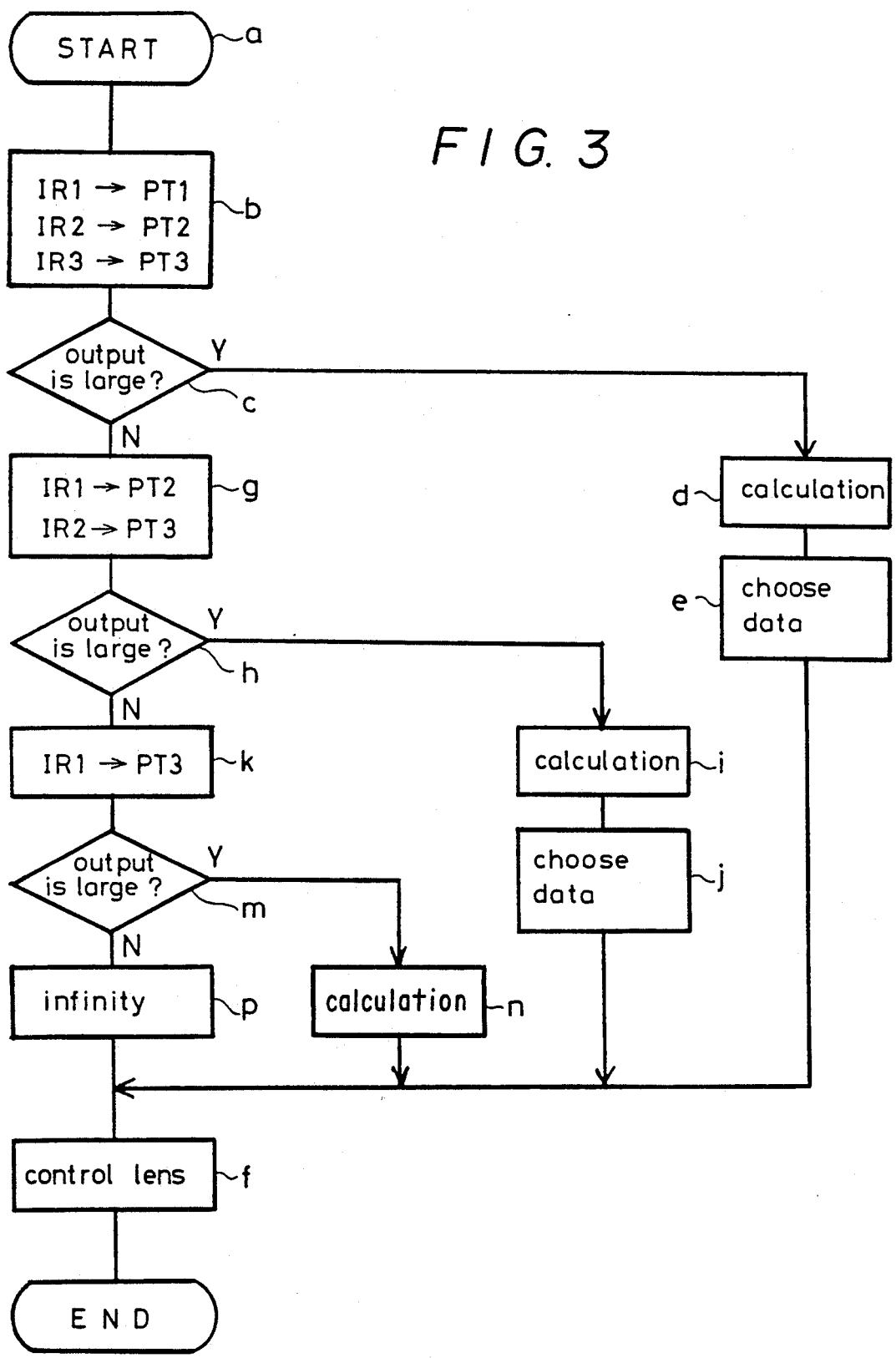
FIG. 3 is a flowchart showing the operation of the first embodiment.

FIGS. 1, 2, and 3 show a first embodiment of the present invention. In FIG. 1, IR1, IR2, and IR3 are light projecting elements, each comprising a light emitting diode for emitting far infrared light. These light projecting elements IR1, IR2, and IR3 are arranged in a row in front of a camera (not illustrated).

LS1 is a light projecting lens for projecting the light from each of the light projecting elements IR1, IR2, and IR3 to form corresponding irradiation beams traveling in different directions.

The light projecting elements IR1, IR2, and IR3 and the light projecting lens LS1 constitute light projecting means.

EM is a light projecting circuit for causing the light projecting elements IR1, IR2, and IR3 to emit light in a time-sharing manner.

PT1, PT2, and PT3 are light receiving elements, each comprised of a plurality of photodiodes. Each of the light receiving elements PT1, PT2, and PT3 receives the reflected light from one of the subjects SB1, SB2, and SB3 to be photographed to provide a output signal corresponding to the point in its longitudinal direction at which light is received. The light receiving elements PT1, PT2, and PT3 are arranged in a row in front of the camera and each correspond to a separate light projecting element IR1, IR2, and IR3 in a general distance measurement condition.

LS2 is a light receiving lens for focusing the reflected light from each of the subjects on the light receiving elements PT1, PT2, and PT3.

CH is a changeover circuit acting as a changeover means, which, upon receipt of a control signal from a main control circuit CR described later, changes the correlation between the light projecting elements IR1, IR2, and IR3 and the light receiving elements PT1, PT2, and PT3. In a normal distance measuring condition, the correlation between the light projecting elements IR1, IR2, and IR3 and the light receiving elements PT1, PT2, and PT3 is such that IR1 corresponds to PT1, IR2 to PT2, and IR3 to PT3. That is, in the normal distance measuring condition, the light receiving element PT1, PT2, or PT3 is selected in response to the light emission timing of the light projecting element IR1, IR2, or IR3, respectively.

DT1 and DT2 are detecting circuits for detecting the output signals of the light receiving element PT1, PT2, or PT3 as selected by the changeover circuit CH.

CP is a comparing circuit which provides an output when the output signal of the light receiving element PT1, PT2 or PT3 that is detected by the detecting circuit DT2 exceeds a preset reference value. Although this embodiment effects a comparison on the basis of the output signal from one detecting circuit, the comparison may be effected on the basis of the output signals of the two detecting circuits.

OP is an arithmetic circuit which provides an output signal corresponding to the distance to a subject to be photographed on the basis of the output signal of the detecting circuits DT1 and DT2.

AD is an A/D converting circuit for converting the output signal of the arithmetic circuit OP from analog to digital form to provide a range value.

MR is a storage circuit comprising a ROM (read-only memory). This storage circuit MR holds conversion coefficients used in converting the range value given by the A/D converting circuit AD into a real distance value. Different sets of conversion coefficients are provided depending on the correlation between the light projecting elements IR1, IR2, and IR3 and the light receiving elements PT1, PT2, and PT3.

CR is a main control circuit for controlling the whole system.

LC is a lens control circuit for controlling the position of the lens of the camera in response to the distance information from the main control circuit CR.

The principle of operation will now be described with reference to FIG. 2.

When there is a certain distance between the camera and subjects SB11, SB22, and SB33 to be photographed, e.g., when the subjects are present outside the macro region, the irradiation beams projected from the light projecting elements IR1, IR2, and IR3 toward the subjects can be received by the light receiving elements PT1, PT2, and PT3, respectively. On the other hand, when subjects SB12 and SB23 are present in the macro region, the angle of reflection r12, r23, increases. Consequently, the irradiation beam projected from the light projecting element IR1 toward the subject SB12, for example, cannot be received by the light receiving element PT1. In such a case, the irradiation beam projected from the light projecting element IR1 toward the subject SB12 is received by the light receiving element PT2, the irradiation beam projected from the light projecting element IR2 toward the subject SB23 is received by the light receiving element PT3, and the outputs of these light receiving elements are processed. When a subject SB13 is present at a very short distance (in a very macro region), the irradiation beam projected from the light projecting element IR1 toward the subject SB13 is received by the light receiving element PT3, and the output of this light receiving element is processed.

The operation of the embodiment will be described with reference to the flowchart of FIG. 3.

(a) When a release switch (not illustrated) of the camera is depressed, a series of operations begins as follows:

(b) First, under the control of the changeover circuit CH, the light receiving element PT1 is selected at the emission timing of the light projecting element IR1, the light receiving element PT2 at the emission timing of the light projecting element IR2, and the light receiving element PT3 at the emission timing of the light projecting element IR3.

(c) The output signal of each of the light receiving elements PT1, PT2, and PT3 that is detected by the detecting circuit DT2 is compared in the comparing circuit CP with a preset reference value.

(d) When at least one of the output signals of the light receiving elements PT1, PT2, and PT3 is larger than the reference value, i.e., when the subject is present outside the macro region, the following operation is performed: Data processing is performed in the arithmetic circuit OP on the basis of the output signals of the detecting circuits DT1 and DT2. Each calculation result is converted in the A/D converting circuit AD from analog to digital form and then sent to the main control circuit CR as a range value.

(e) In the main control circuit CR, the smallest value among the range data in digital form is chosen and used as a distance value. The lens control circuit LC controls the position of the lens of the camera on the basis of the distance value given from the main control circuit CR.

(f) The lens control circuit LC controls the position of the lens of the camera on the basis of the distance value given from the main control circuit CR.

(g) When all of the output signals of the light receiving elements PT1, PT2, and PT3 are smaller than the reference value stored in the comparing circuit CP, as tested at step (c), the correlation between the light projecting elements and the light receiving elements is changed. Consequently, under the control of the changeover circuit CH, the light receiving element PT2 is selected at the emission timing of the light projecting element IR1 and the light receiving element PT3 at the emission timing of the light projecting element IR2.

(h) Each of the output signals of the light receiving elements PT2 and PT3 that are detected by the detecting circuit DT2 is compared in the comparing circuit CP with the preset reference value.

(i) When either of the output signals of the light receiving elements PT2 and PT3 is larger than the reference value, i.e., when the subject is present in the macro region, the following operation is performed: Data processing is performed in the arithmetic circuit OP on the basis of the output signals of the detecting circuits DT1 and DT2. Each calculation result is converted in the A/D converting circuit AD from analog to digital form and then sent to the main control circuit CR as a range value.

(j) In the main control circuit CR, the smaller of the two range values in digital form is chosen. The thus chosen range value is converted into a real distance value on the basis of the conversion data held in the storage circuit MR. The program then proceeds to step (f).

(k) When both of the output signals of the light receiving elements PT2 and PT3 are smaller than the reference value held in the comparing circuit CP, as tested at step (h), the correlation between the light projecting elements and the light receiving elements is changed. Consequently, under the control of the changeover circuit CH, the light receiving element PT3 is selected at the emission timing of the light projecting element IR1.

(m) The output signal of the light receiving element PT3 that is detected by the detecting circuit DT2 is compared in the comparing circuit CP with the present reference value.

(n) When the output signal of the light receiving element PT3 is larger than the reference value, i.e., when the subject is present in the very macro region, the following operation is performed: Data processing is performed in the arithmetic circuit OP on the basis of the output signals of the detecting circuits DT1 and DT2. The calculation result is converted in the A/D converting circuit from analog to digital form and then sent to the main control circuit CR as a range value. The range value is converted into a real distance value on the basis of the conversion data held in the storage circuit MR. The lens control circuit LC controls the position of the lens of the camera on the basis of the distance value given from the main control circuit CR.

(p) When the output signal of the light receiving element PT3 is smaller than the reference value held in the comparing circuit CP, as tested at step (m), the distance to the subject is considered as infinity; thus, infinity is used as the distance value. The lens control circuit LC controls the position of the lens of the camera on the basis of the distance value given from the main control circuit CR in accordance with step (f).

As described above, this embodiment can focus the camera lens automatically in a wide range between the condition when the subject is positioned remote from the camera and when it is positioned at a very short distance.

Embodiment 2

Figure 4:
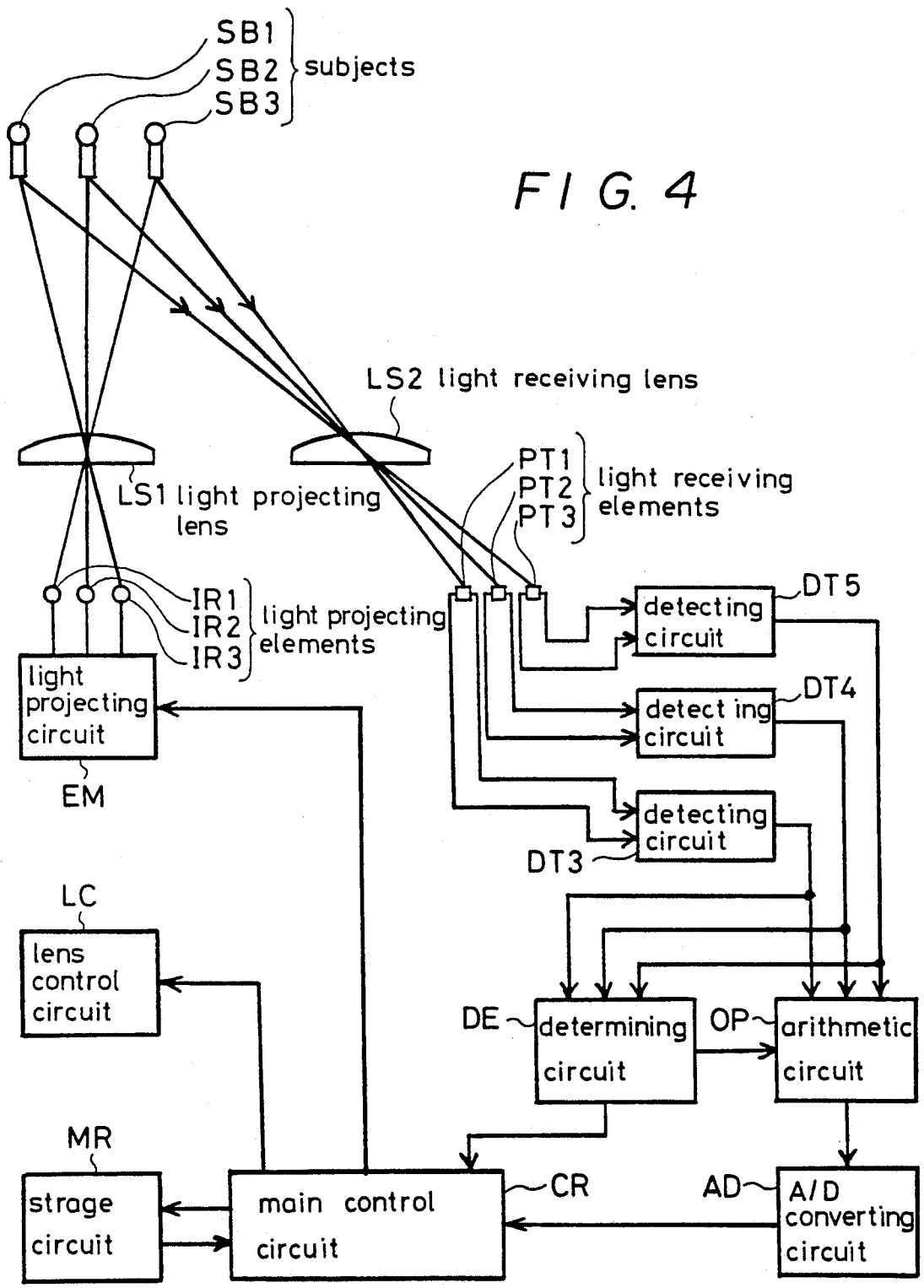
FIG. 4 is a block diagram showing a second embodiment of the invention.

FIG. 4 shows a second embodiment of the present invention, whose principle of operation is as described with reference to FIG. 2.

Since most components shown in FIG. 4 which are designated by the same reference symbols as used in FIG. 1 are identical with those shown in FIG. 1, only the components designated by new reference symbols alone will be described.

DT3, DT4, and DT5 are detecting circuits for detecting the output signals of the light receiving elements PT1, PT2, and PT3, respectively.

DE is a determining circuit for determining which light receiving element has received the reflected light from the subject on the basis of the output signals of the detecting circuits DT3, DT4, and DT5.

The operation of this embodiment will now be described.

When the release switch of the camera is depressed, a series of operations begins as follows:

In accordance with the signal from the light projecting circuit EM, the light projecting elements IR1, IR2, and IR3 successively emit light in time-sharing manner. At each emission timing, it is determined which light receiving element has received the reflected light from the subject. Specifically, a determination is made in the determining circuit DE on the basis of the output signals of the detecting circuits DT3, DT4, and DT5. The determination result is sent to the arithmetic circuit OP. For example, when it is determined that the reflected light from the subject has been received by the light receiving element PT2, data processing is performed in the arithmetic circuit OP on the basis of the output signal of the detecting circuit DT4. The calculation result is converted in the A/D converting circuit AD from analog to digital form and then sent to the main control circuit CR as a range value. In the main control CR, the smallest value among the range data obtained at each emission timing (three times in the embodiment) is chosen as the value of distance to the subject. The lens control circuit LC controls the position of the lens of the camera on the basis of the distance value given from the main control circuit CR.

As described above, this embodiment can focus the camera lens automatically with a reduced number of distance measurements (three times in this embodiment) in a wide range between the condition when the subject is positioned remote from the camera and when it is positioned at a very short distance.

In the first and second embodiments, "Macro" or "Very Macro", for example, may be displayed in the finder when the subject is determined as being positioned in the macro region or in the very macro region, respectively.

Although the first and second embodiments automatically select the normal region, macro region or very macro region, the selection of region may be performed by manual switching.

The invention makes it possible to change the correlation between the light projecting means and the light receiving means or to determine which light receiving element has received the reflected light from the subject, whereby distance measurement in the macro region can be readily performed.

Although the present invention has been described through specific terms, it should be noted here that the described embodiment is not necessarily exclusive and that various changes and modifications may be imparted thereto without departing from the scope of the invention which is limited solely by the appended claims.

What I claim is:

1. In a range meter for a camera, comprising a plurality of sources of irradiation arranged to direct irradiation beams in different directions, a plurality of light receiving means for receiving irradiation beams reflected from a subject to be photographed, whereby the position at which irradiation is received on each of said receiving means is a function of the direction that the beam of light is propagated from the respective source and the distance between the respective source of irradiation and the subject, and said receiving means comprising means for providing an output that is a function of the position on said recording means that said reflected light is received, and means coupled to said receiving means for determining said distance in response to the output of said receiving means, the improvement wherein said means for determining said distance comprises means for selectively sensing the outputs of at least one of said receiving means responsive to irradiated beams from more than one of said sources, and means for determining said distance only from outputs of said receiving means that exceed a predetermined minimum value.

2. The range meter of claim 1 wherein said means for selectively sensing comprises first means for initially sensing the outputs of said receiving means responsive to a given set of said sources, and, if any of said outputs exceeds said predetermined minimum value, determining said distance therefrom.

3. The range meter of claim 2 wherein said means for selectively sensing further comprises means responsive to the absence of the sensing of an output that exceeds said predetermined minimum value by said first means for sensing the outputs of at least one of said receiving means responsive to irradiation from a different source than sensed by said first means, to determine said distance therefrom if the output of said one receiving means exceeds said predetermined minimum value.

4. The range meter of claim 1 wherein said means for selectively sensing comprises means for selectively sensing the outputs of different sets of said receiving means that are responsive to the irradiation of different sets of said sources, to determine a range of distances into which the distance between a subject and said sources falls, and means for determining said distance in response to outputs of said receiving means that correspond to said range of distances.

5. A range meter for cameras comprising a projecting means for projecting first and second irradiation beams in first and second directions, respectively;

first and second receiving means for receiving irradiation beams from said projecting means that are reflected from a subject to be photographed, each of said receiving means providing an output that is a function of a position on the respective receiving means on which the respective reflected beam is received;

a first determining means for determining a distance to the subject on the basis of an output of said first receiving means responsive to said beam irradiated in said first direction;

a second determining means for determining a distance to the subject on the basis of an output of said second receiving means responsive to said beam irradiated in said second direction;

a third determining means for determining a distance to the subject on the basis of an output of said second receiving means responsive to said beam irradiated in said first direction; and a selecting means for selecting the output of one of said first, second and third determining means.

* * * * *